(12) United States Patent
Shats

(10) Patent No.: US 11,960,474 B2
(45) Date of Patent: Apr. 16, 2024

(54) IN-PLACE MAP DATABASE UPDATE

(71) Applicant: Red Bend Ltd., Hod Hasharon (IL)

(72) Inventor: Nir Shats, Hafetz Haim (IL)

(73) Assignee: RED BEND LTD., Hod Hasharon (IL)

( * ) Notice: Subject to any disclaimer, the term of this patent is extended or adjusted under 35 U.S.C. 154(b) by 431 days.

(21) Appl. No.: 17/437,002

(22) PCT Filed: Mar. 7, 2019

(86) PCT No.: PCT/IL2019/050255
§ 371 (c)(1),
(2) Date: Sep. 7, 2021

(87) PCT Pub. No.: WO2020/178808
PCT Pub. Date: Sep. 10, 2020

(65) Prior Publication Data
US 2022/0179845 A1  Jun. 9, 2022

(51) Int. Cl.
*G06F 16/00* (2019.01)
*G06F 16/22* (2019.01)
(Continued)

(52) U.S. Cl.
CPC ........ *G06F 16/2379* (2019.01); *G06F 16/221* (2019.01); *G06F 16/2264* (2019.01); *G06F 16/24568* (2019.01); *G06F 16/29* (2019.01)

(58) Field of Classification Search
CPC .......... G06F 16/2379; G06F 16/24568; G06F 16/221; G06F 16/2264; G06F 16/29
(Continued)

(56) References Cited

U.S. PATENT DOCUMENTS

| 2005/0278399 A1 | 12/2005 | Herle et al. |
| 2017/0116213 A1* | 4/2017 | Jain ..................... G06F 16/2365 |
| 2018/0060181 A1* | 3/2018 | Rajamani ............ G06F 11/1451 |

FOREIGN PATENT DOCUMENTS

| WO | 2013180732 A1 | 12/2013 |
| WO | 2015149885 A1 | 10/2015 |
| WO | 2020178808 A1 | 9/2020 |

OTHER PUBLICATIONS

European Patent Office, Office Action Issued in Application No. 19712299.7, dated Aug. 11, 2023, Netherlands, 9 pages.
(Continued)

*Primary Examiner* — Chelcie L Daye
(74) *Attorney, Agent, or Firm* — McCoy Russell LLP

(57) ABSTRACT

A method of generating a delta instructions record for updating a source database in-place, comprising obtaining a plurality of source data items contained in a plurality of cells of a plurality of tables organized in tuples and columns, creating a column oriented source stream serializing the source data items by concatenating a source data item of each cell of each column to a preceding source data item of a cell preceding the respective cell in the respective column, obtaining a plurality of target data items contained tables of a target database comprising data item(s) changed compared to the source database, creating a column oriented target stream serializing the plurality of target data items, delta instructions for applying changes detected between the source database and the target database by comparing between the source stream and the target stream, and outputting the delta instructions record to device(s) for updating their source database.

20 Claims, 3 Drawing Sheets

(51) Int. Cl.
  *G06F 16/23* (2019.01)
  *G06F 16/2455* (2019.01)
  *G06F 16/29* (2019.01)
(58) Field of Classification Search
  USPC ........................................................ 707/609
  See application file for complete search history.

(56) References Cited

OTHER PUBLICATIONS

Korn, D. et al., "Engineering a Differencing and Compression Data Format," Proceedings of the 2002 USENIX Annual Technical Conference, Jun. 10, 2002, Monterey, California, 10 pages.
Stolze, K., "Integration of Spatial Vector Data in Enterprise Relational Database Environments," Doctoral Dissertation, Friedrich-Schiller-Universität Jena, Nov. 10, 2006, 352 pages.
ISA European Patent Office, International Search Report and Written Opinion Issued in Application No. PCT/IB2019/050255, dated May 27, 2019, WIPO, 18 pages.
Stolze, K., "Integration of Spatial Vector Data in Enterprise Relational Database Environments," Doctorate Dissertation in Engineering, School of Mathematics and Computer Science, Friedrich Schiller University, Jul. 2006, 352 pages.
Schwartz, B., "An Algorithm to Find and Resolve Data Differences Between MySQL Tables," xaprb Website, Available Online at https://www.xaprb.com/blog/2007/03/05/an-algorithm-to-find-and-resolve-data-differences-between-mysql-tables.com/, Mar. 5, 2007, 6 pages.
"MySQL Compare Two Tables," MySQL Tutorial Website, Available Online at https://www.mysqltutorial.org/compare-two-tables-to-find-unmatched-records-mysql.aspx, Available as Early as Jun. 17, 2008, 6 pages.
Krueger, J. et al., "Merging Differential Updates in In-Memory Column Store," Proceedings of the Third International Conference on Advances in Databases, Knowledge, and Data Applications (DBKDA 2011), Jan. 23, 2011, St. Maarten, The Netherlands Antilles, 6 pages.
Lopez, J., "Differential Buffer for a Relational Column Store In-Memory Database," Project for University Carlos III of Madrid, Degree in Computer Engineering, Carlos III University IT Department, Jun. 2013, 134 pages.
"sqldiff.exe: Database Difference Utility," SQLite Website, Available Online at https://www.sqlite.org/sqldiff.html#:~:text=The%20sqldiff.exe%20utility%20works,have%20the%20same%20PRIMARY%20KEY., Available as Early as May 10, 2015, 3 pages.
Bird, G., "Diff Your Databases with couchdiff—Command-Line tool for comparing two Apache CouchDB or Cloudant databases," Medium Website, Available Online at https://medium.com/codait/diff-your-databases-with-couchdiff-f69943f9dc97, May 10, 2017, 7 pages.
Estrade, B., "mysqldiff—compare MySQL database schemas," meta cpan Website, Available Online at https://metacpan.org/dist/MySQL-Diff/view/bin/mysqldiff#:~: text=mysqldiff%20is%20a%20Perl%20script,the%20first%20database%20to%20be, Jun. 5, 2018, 5 pages.
"DBDiff CLI—Database Diff Command Line Interface," GitHub Website, Available Online at https://github.com/DBDiff/DBDiff, Retrieved on Mar. 10, 2019, 5 pages.
ISA European Patent Office, International Search Report and Written Opinion Issued in Application No. PCT/IL2019/050255, May 27, 2019, WIPO, 18 pages.
"Paul Heckel's Diff Algorithm," GitHub Gist Website, Available Online at https://gist.github.com/ndarville/3166060, Available as Early as Oct. 29, 2019, 7 pages.
International Bureau of WIPO, International Preliminary Report on Patentability Issued in Application No. PCT/IL2019/050255, dated Sep. 16, 2021, WIPO, 11 pages.

* cited by examiner

IN-PLACE MAP DATABASE UPDATE

CROSS-REFERENCE TO RELATED APPLICATIONS

The present application is a U.S. National Phase of International Patent Application Serial No. PCT/IL2019/050255 entitled "IN-PLACE MAP DATABASE UPDATE," and filed on Mar. 7, 2019. The entire contents of the above-listed application are hereby incorporated by reference for all purposes.

BACKGROUND

Some embodiments described herein relate to updating a database in-place, and, more specifically, but not exclusively, to updating a map database in-place using delta instructions generated based on column oriented comparison between tables of a source database and those of a target database which is an updated version of the source database comprising one or more changed data items compared to the source database.

Databases have long become a major architectural element in the modern computerized environment and are used by a plurality of systems, platforms and services for a plurality of applications.

Due to their capabilities and features, for example, fast access, scalability and reliability among others, databases are constantly being deployed for additional uses and applications among which such databases may be deployed in lower-end devices which may be limited in the computing resources, for example, processing power, storage resources, networking and communication resources and/or the like.

Due to the dynamic nature of the applications relying on the databases, the databases may require often updates to reflect the changes to the data the databases hold.

Updating the database may present a major challenge which may be significantly emphasized and increased when the target devices in which the databases are updated are the low-end devices having limited resources for receiving, storing and processing the updated database which may be very large in size (volume). Moreover, in many scenarios and applications, the low-end devices are mobile devices to which the updated database is transmitted via the limited network and communication resources of the devices.

SUMMARY

According to a first aspect described herein there is provided a method of generating a delta instructions record for updating a source database in-place, comprising using one or more processors for:

Obtaining a plurality of source data items contained in a plurality of cells of a plurality of tables of a source database, each of the plurality of tables is organized in a plurality of tuples and a plurality of columns.

Creating a column oriented source stream serializing the plurality of source data items by concatenating a source data item of each cell of each of the plurality of columns to a preceding source data item of a cell preceding the respective cell in the respective column.

Obtaining a plurality of target data items contained in a plurality of tables of a target database which is an updated version of the source database comprising one or more data items changed compared to a respective source data items.

Creating a column oriented target stream serializing the plurality of target data items such that each target data item is concatenated to a preceding target data item.

Generating a delta instructions record comprising instructions for applying changes detected between the source database and the target database by comparing between the source stream and the target stream.

Outputting the delta instructions record which is used to update the source database to the target database.

According to a second aspect described herein there is provided a system for generating a delta instructions record for updating a source database in-place, comprising one or more processors executing a code, the code comprising:

Code instructions to obtain a plurality of source data items contained in a plurality of cells of a plurality of tables of a source database. Each of the plurality of tables is organized in a plurality of tuples and a plurality of columns.

Code instructions to create a column oriented source stream serializing the plurality of source data items by concatenating a source data item of each cell of each of the plurality of columns to a preceding source data item of a cell preceding the respective cell in the respective column Code instructions to obtain a plurality of target data items contained in a plurality of tables of a target database which is an updated version of the source database comprising one or more data items changed compared to a respective source data items.

Code instructions to create a column oriented target stream serializing the plurality of target data items such that each target data item is concatenated to a preceding target data item.

Code instructions to generate a delta instructions record comprising instructions for applying changes detected between the source database and the target database by comparing between the source stream and the target stream.

Code instructions to output the delta instructions record which is used to update the source database to the target database.

According to a third aspect described herein there is provided a method of updating a source database in-place to create a target database using a delta instructions record generated based on columns comparison between the source database and the target database, comprising using one or more processors of a device storing a source database, the processor(s) is used for:

receiving a delta instructions record comprising instructions for applying changes detected between a source database comprising a plurality of data items contained in a plurality of tables organized in a plurality of tuples and a plurality of columns and a target database comprising one or more data items changed compared to a respective data item in the source database. The delta instructions record is created by comparing between a serialized source stream and a serialized target stream created for the source database and for the target database respectively by concatenating a data item of each cell of each of the plurality of columns to a preceding data item of a cell preceding the respective cell in the respective column.

Updating the source database in a plurality of iteration by performing the following in each of the plurality of iterations:

Read a respective one of a plurality of segments of the source database from a storage medium.

Update the respective segment by applying at least some of a plurality of instructions included in the delta instructions record which relate to the respective segment.

Write the respective updated segment to the storage medium.

According to a fourth aspect described herein there is provided a device for updating a source database in-place to create a target database using a delta instructions record generated based on columns comparison between the source database and the target database, comprising using one or more processors of a device storing a source database, the processor(s) is executing a code, the code comprising:

Code instructions to receive a delta instructions record comprising instructions for applying changes detected between a source database comprising a plurality of data items contained in a plurality of tables organized in a plurality of tuples and a plurality of columns and a target database comprising one or more data items changed compared to a respective data item in the source database. The delta instructions record is created by comparing between a serialized source stream and a serialized target stream created for the source database and for the target database respectively by concatenating a data item of each cell of each of the plurality of columns to a preceding data item of a cell preceding the respective cell in the respective column.

Code instructions to update the source database in a plurality of iteration by performing the following in each of the plurality of iterations:

Read a respective one of a plurality of segments of the source database from a storage medium.

Update the respective segment by applying at least some of a plurality of instructions included in the delta instructions record which relate to the respective segment.

Write the respective updated segment to the storage medium.

In an optional implementation form of the first, second, third and/or fourth aspects, one or more of the plurality of tables is a multi-dimension table in which one or more cells are associated with another table.

In a further implementation form of the first, second, third and/or fourth aspects, the source database is a navigation map database comprising one or more tables in which the plurality of tuples are tiles corresponding to respective geographical regions and each of the plurality of columns is a data layer comprising data associated with the respective geographical region.

In an optional implementation form of the first, second, third and/or fourth aspects, one or more of the tables of the navigation map database is a multi-dimension table in which each tile is associated with a plurality of data layers.

In an optional implementation form of the first and/or second aspects, a representation of the source database and/or the target database is manipulated to create a common representation for the source database and the target database.

In an optional implementation form of the first and/or second aspects, the source database and the target database are analyzed to identify one or more identical tuples in the source database and the target database, the identical tuple(s) is discarded from the source database and from the target database prior to generating the source stream and the target stream respectively.

In a further implementation form of the first and/or second aspects, a source data item of a first cell of each of the columns is concatenated in the source stream to a preceding source data item of a last cell of a column preceding the respective column in a respective one of the plurality of tables of the source database. A target data item of the first cell of each of the columns is concatenated in the target stream to the preceding target data item of the last cell of the column preceding the respective column in a respective one of the plurality of tables of the target database.

In an optional implementation form of the first and/or second aspects, one or more of the columns in the source database and in the target database are reordered prior to generating the source stream and the target stream respectively according to a type of the data items of the respective column such that the first cell of the respective column is concatenated in the source stream and in the target stream respectively to the last cell of a reordered preceding column.

In an optional implementation form of the first and/or second aspects, cross table reordering is applied to reorder one or more columns in the source database and in the target database across tables prior to generating the source stream and the target stream respectively. The first cell of each of one or more referenced columns is concatenated in the source stream and in the target stream respectively to the last cell of a referencing column comprising a reference key to the respective referenced column.

In a further implementation form of the first and/or second aspects, the instructions in the delta instructions record include a copy instruction, a replace instruction and an insert instruction, wherein:

The copy instruction is directed to copy a source data item from the source database.

The replace instruction is directed to replace a source data item with another data item.

The insert instruction is directed to insert a target data item from the target database.

In an optional implementation form of the third and/or fourth aspects, a representation of the source database is manipulated to create a representation for the source database that is compatible with a representation of the source database used to create the delta instructions record.

In a further implementation form of the third and/or fourth aspects, a size of each of the plurality of segments is fixed and/or adjustable according to volatile memory resource available at the device.

In a further implementation form of the third and/or fourth aspects, the processor(s) uses an abstraction layer for accessing the source database as a virtual file system in which each of the plurality of tables is accessed as a folder and each of the plurality of tuples is accessed as a file.

In a further implementation form of the third and/or fourth aspects, the file abstraction of each of the plurality of tuples support random read access.

In a further implementation form of the third and/or fourth aspects, the file abstraction of each of the plurality of tuples support sequential write access.

Unless otherwise defined, all technical and/or scientific terms used herein have the same meaning as commonly understood by one of ordinary skill in the art to which some embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

Implementation of the method and/or system of some embodiments described herein can involve performing or completing selected tasks manually, automatically, or a combination thereof. Moreover, according to actual instrumentation and equipment of the method and/or system of embodiments described herein, several selected tasks could be implemented by hardware, by software or by firmware or by a combination thereof using an operating system.

For example, hardware for performing selected tasks according to some embodiments described herein could be implemented as a chip or a circuit. As software, selected tasks according to some embodiments described herein could be implemented as a plurality of software instructions being executed by a computer using any suitable operating system. In exemplary embodiments described herein, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments described herein. In this regard, the description taken with the drawings makes apparent to those skilled in the art how embodiments described herein may be practiced.

In the drawings.

DETAILED DESCRIPTION

Figure 1:
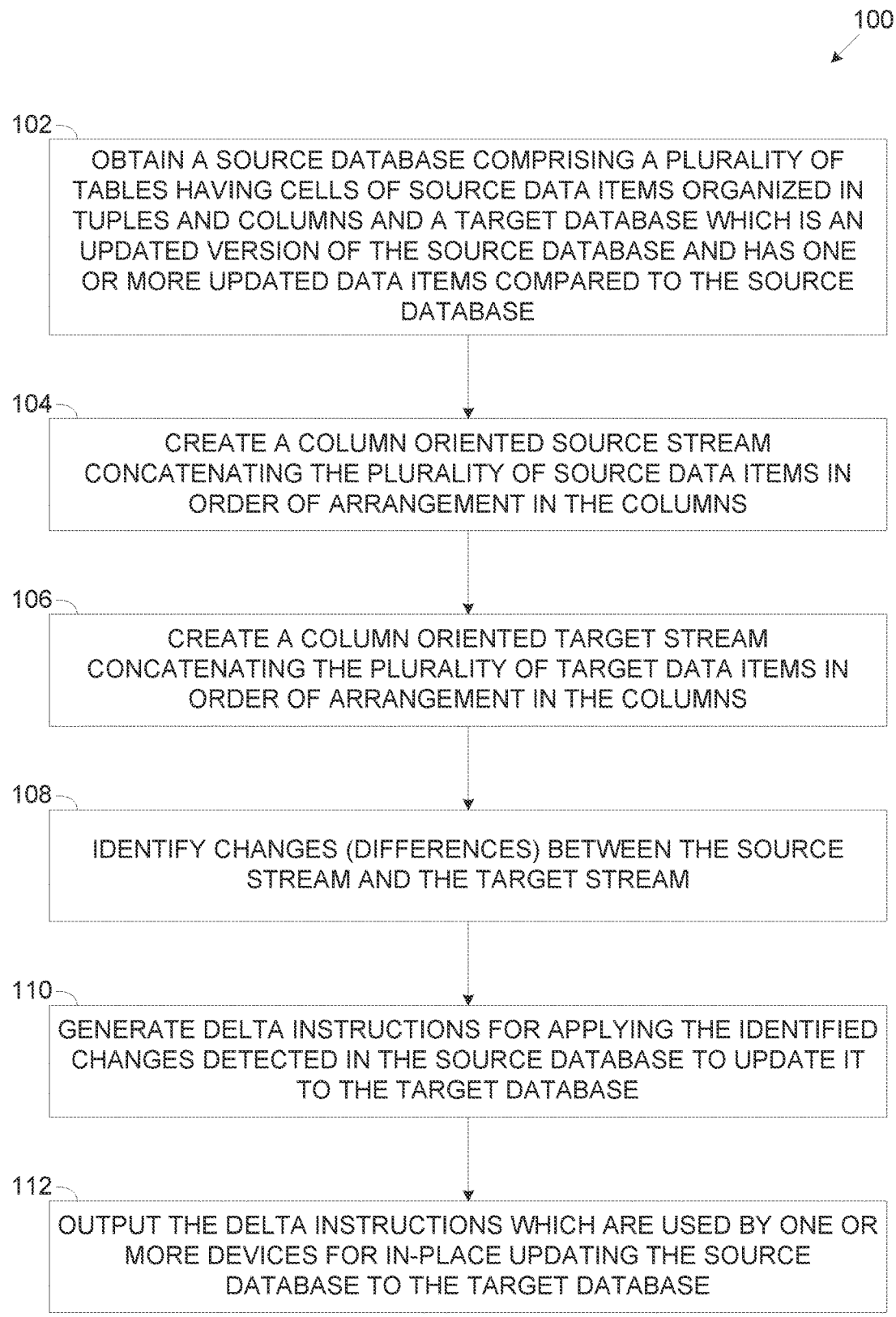
FIG. 1 is a flowchart of an exemplary process of generating delta instructions for in-place updating a database based on column oriented change detection in tables of a source and target databases, according to some embodiments described herein.

Some embodiments described herein relate to updating a database in-place, and, more specifically, but not exclusively, to updating a map database in-place using delta instructions generated based on column oriented comparison between tables of a source database and those of a target database which is an updated version of the source database comprising one or more changed data items compared to the source database.

According to some embodiments described herein, there are provided methods, systems and computer program products for generating delta instructions for updating a source database comprising a plurality of data items contained in cells of a plurality of tables arranged in tuples (rows) and columns to create a target database which is an updated version of the source database and hence comprises respective tables. Moreover, the source database (and hence the target database) may be multi-dimensional databases. For example, a database comprising one or more other databases, a database comprising one or more tables in which cells are associated with other tables and/or the like.

The source database (and hence the target database) may include navigation map databases, for example, a Navigation Data Standard (NDS) database and/or the like comprising navigation data for a geographical area divided to a plurality of limited and typically fixed size (for example, 1 square kilometer) tiles. The navigation map databases may include one or more tables in which the tuples correspond to respective tiles of the geographical area and the columns correspond to data layers containing data associated with the respective tiles. Moreover, such navigation map databases may also include multi-dimension tables in which one or more cells in one or more of the table(s) is associated with other table(s).

The delta instructions are generated to support in-place update of the database such that the database is updated without creating a full copy of the target database and replacing the entire source database with the target database. The delta instructions are therefore generated to update only data items which are changed (different) in the target database compared to the source database.

The delta instructions may be used by one or more devices which locally store the source database for updating the source database to the target database. In particular, the delta instructions are generated to support low-end devices having limited computing resources (processing power), storage resources (volatile and/or non-volatile memory capacity) and/or networking resources (bandwidth, latency, limited power for operating communication interface(s), etc.). Such low-end devices may include, for example, a navigation device of a vehicle (e.g. a land vehicle, an aerial vehicle, a naval vehicle, etc.) which locally stores a navigation map database (source database). The locally stored navigation map database may require frequent updates (to the target database) to reflect changes in the geographical area mapped by the navigation map database.

The delta instructions may be typically transmitted to the devices which may use the delta instructions for field updating their locally stored source database. Due to the delta instructions small size compared to the size of the target database, transmitting the delta instructions to the devices may consume significantly less networking resources compared to transmission of the entire target database thus making the delta instructions highly suitable for the low-end devices having limited networking resources. Moreover, transmitting the delta instructions may significantly reduce the transmission time thus reducing the overall update time and expediting return of the device to full functionality. In some scenarios the delta instructions may be provided to the devices using a storage media that may be physically attached to the devices. Once the delta instructions are transferred, the device may use them to update its locally stored source database even after disconnected from the storage media. As for the delta instructions transmission, transferring the small size delta instructions from the attached storage media to the devices may significantly reduce the transfer time compared to transferring the entire target database and hence allow short attachment periods which may be of high benefit for quick maintenance of field devices.

Moreover, due to the small footprint (storage volume) of the delta instructions compared to the complete target database, the storage resource required at the device for storing the delta instructions may be significantly reduced compared to the storage resources required for storing the target database. Reducing the required storage resources may be another major advantage for applying it for the low-end devices having limited storage resources.

In addition, the devices updating their local source database to the target database using the delta instructions may be significantly more immune to update failures compared to replacing the entire source database with the target database. This is since the delta instructions may be applied to limited size segments of the source database. Therefore in case of an update failure (e.g. power loss, file corruption, transmission error, etc.) only a limited size segment of the database may be affected while the rest of the database may be fully recovered. Moreover, it is possible to allocate significantly small storage space (which may be supported even by the low-end devices) to maintain a recovery version of the currently updated segment and in case of update failure restore the failed segment thus fully restoring the entire database. This is as opposed to a full re-Flash in which the entire source database is replaced with the target database. An update failure during the re-Flash may lead to a corrupt database thus making the database completely useless thus requiring extensive maintenance operations to restore it. This may naturally be overcome by maintaining a full recovery copy of the source database, however storing a full copy of the source database may be impractical for the low-end devices having very limited storage resources.

In order to create the delta instructions, the changes (differences) between the source database and the target database are first identified by comparing between the data (data items) of the source database and data of the target database. One common and highly efficient method for comparing the source and target databases is converting the databases to respective 1-dimensional sequences and comparing between a source sequence created for source database and a target sequence created for the target database to identify the changes (differences) in the data items of the target database compared to the source database.

Processing the 1-dimensional sequence source and target streams may be significantly more effective with respect to the resource utilization since there exist powerful difference detection (diff) algorithms as known in the art, for example, bsdiff, spiff and/or the like which are highly efficient for identifying differences between 1-dimensional sequences of data. Using the existing and efficient diff algorithm(s) may significantly improve resource utilization since these diff algorithm(s) have been field proven. Moreover, the 1-dimensional sequences may require significantly reduced storage resources since they may be processed in partial streams (stream segmentation) as described herein after thus better targeting the limited resources low-end devices. Furthermore, no additional tools, algorithms and/or techniques are required for comparing the source database and the target database thus reducing the development effort for identifying the changed data items.

Specifically, the source stream and the target stream are created for the source database and the target database respectively by applying column oriented serialization (column by column) in which the data items are concatenated in their column order rather than in their tuple (row) order as is typically done. As such each data item is concatenated to a data item contained in a cell preceding the cell of the respective data item in the same column of the respective cell. To concatenate columns, the data item contained in the first cell of a column is concatenated to the data item contained in the last cell of a preceding column. Similarly, to concatenate table, the data item in the first cell of a first column in a table is concatenated to the data item contained in the last cell of the last column in a preceding table. In case of a multi-dimension database, the multiple databases and/or hierarchical tables may be recursively traversed to concatenate the data items encapsulated in the embedded (lower level) database(s) to the data items of the parent database in a hierarchical order.

After generating the column oriented sequential source and target streams, the diff algorithm(s) may be applied to the two streams to identify the changes (differences) between the two streams, i.e., to identify the changed data items in the target database compared to the source database.

The delta instructions are generated, based on the identified changes (differences) between the source stream and the target stream, to dictate delta operations that should be applied for updating the source stream to create the target stream which may be restored back to create the target database. The delta instructions may include, for example, Copy delta update instruction for copying data item(s) from the source stream to the target stream, Replace delta update instruction to manipulate data item(s) of the source stream and copy them to the target stream, Insert delta update instruction to insert new data item(s) into the target stream and/or the like. Some of the delta operations, specifically the Insert operation may be more resources consuming ("expensive") compared the Copy operation or even the Replace operation which may be more resource effective since transfer, of data items which are identified in the source database may be avoided and such data items may be simply copied from the source database and/or manipulated accordingly.

Serializing the data items contained in the tables of the source database and the target database in the column oriented stream may be significantly more effective compared to the tuple oriented serialization stream as may be applied by existing methods. Since each of the columns in the database tables typically holds fields of similar data types, the data items within each column may be highly correlated, for example, share a common type, share a common values range and/or the like. The source stream as well as the target stream may therefore include highly related data items in close spatial proximity with each other (i.e. close to each other in the stream) since subsequent data items originate from the same columns. This is as opposed to the tuple oriented serialization in which data items are concatenated to each other have little and potentially no correlation with each other.

Applying the diff algorithm(s) to the column oriented source and target streams may therefore yield a significantly higher number of matches, in particular, longer matches of respective segments of the source stream and the target stream and hence significantly reduced number of differences (changes) compared to the tuple oriented serialization.

Moreover, due to limited computing and storage resources as well as the potentially large size of the source and target databases, the diff algorithm(s) may typically process only a limited section of the databases at a time by applying a sliding window to sequentially traverse the entire database. The diff algorithm(s) may therefore apply a limited size sliding window scheme in which respective limited size parts (segments) of the source database and the target database are compared.

In the tuple (row by row) serialization, the sliding window may therefore span a limited number of tuples (i.e., rows, lines, records) of the respective tables in the source database and the target database. The data analyzed in each sliding window state which is arranged by tuples may therefore include data items originating from different columns and are thus significantly unrelated with respect to their data type and/or value range. As result matching data items which are processed in different windows may be missed resulting in resources consuming delta update instructions.

In contrast, the diff algorithm(s) applied to the column oriented serialized source stream and target stream may yield significantly longer matching sequences thus reducing the number of 'expensive" delta instructions such as the Insert delta instruction. Moreover, even if shifted, matching data items which originate form respective columns in the source and target database may be located in close proximity in the source and target streams thus processed in the same window thus allowing the diff algorithm(s) to identify such matches.

Optionally, prior to creating the source stream and the target stream, one or more preprocessing operations are applied. For example, one or more corresponding tuples which are determined to be identical in the source data base and in the target database may be removed and not included in the comparison of the two streams. An indication of each removed tuple may be included in the delta instructions to support proper application of the delta instructions for updating another source stream using the delta instructions to create the target stream. In another example, one or more columns of a table and/or across tables may be reordered to have their data items concatenated one after the other. This re-ordering is also indicated in the delta instructions to facilitative proper usage of the delta instructions.

After generated, the delta instructions may be provided (e.g. delivered, transmitted, etc.) to one or more devices, for example, a mobile navigation device, a navigation device of a vehicle (e.g. a land vehicle, an aerial vehicle, a naval vehicle, etc.) which locally store the source database specifically the navigation map database.

One or more of the devices may use the delta instructions to update their locally stored source database to create the target database. To this end the device(s) may also create the source stream using column based serialization and apply the delta instructions to create a target stream which may be restored to create the target database comprising the updated data items which are changed compared to the locally stored source database.

According to some embodiments described herein, one or more of the devices which receive the delta instructions may use the delta instructions to update in-place their locally stored source database locally. In particular, the device(s) may apply an iterative update process in which the source database is divided to a plurality of segments and a single respective segment is updated in each of the iterations. In these embodiments, the device may retrieve (read) a respective segment of the source database, for example, a column, a table, an element and/or the like and create a respective partial column oriented source stream for the retrieved segment as originally done for the source and target databases to create the delta instructions. The device may then apply the delta instructions applicable for the respective partial source stream to create a respective partial target stream which may be restored to create a respective target segment of the target database.

It is possible for the device to update its locally stored source database by segments since the delta instructions are created for the source and target streams in the first place are directed to portions (segments, chunks) of the streams.

Updating the locally stored source database a segment at a time may significantly reduce the storage resources required at the device, in particular volatile memory since only a single segment of the database is loaded from persistent memory and manipulated at a time. The segmented update of the source database to create the target database may therefore effectively target limited resources low-end devices.

Moreover, applying the segmented update of the source database to create the target database may enable the device to apply the in-place update thus avoiding creation of a full local copy of the target database which may be impractical and not feasible for many of the low-end devices having insufficient storage resources (volatile and/or non-volatile) to host such a local copy.

Furthermore, the device(s) may apply the iterative segmented in-place update of the locally stored source database on the fly while reception of the delta instructions record is in progress. The device may identify the segment(s) of the source database to which a set of delta instructions are received and may retrieve (read) this segment(s) from the source database, create a respective partial column oriented source stream and apply the set of delta instructions to update the partial source stream to the respective target stream which may be restored to create the respective segment(s) in the target database.

Prior to creating each partial source stream, each device updating its locally stored source database may apply the same preprocessing operations, for example, matching tuple removal and columns reordering as indicated in the delta instructions (if indicated) to that the respective partial source stream accurately corresponds to the respective section in the source stream originally used to create the delta instructions.

According to some embodiments described herein the locally stored source database is mounted as a virtual file system in which the tables may be regarded as folders (directories) and the columns may be regarded as files containing the data items stored in the cells (fields) of the columns.

Moreover, a virtualization layer may be deployed to map the source database as the virtual file system. The virtualization layer may be further configured to create the respective partial stream for each source segment read from the source database. Complementary the virtualization layer may restore a respective segment of the target database from a partial target stream created by updating the partial source stream according to the delta instructions and writing the respective segment back to the target database.

Mounting the locally stored source database as a file system and moreover employing the virtualization layer may support simple migration, integration and/or deployment of the in-place segmented database update for a plurality of systems, devices and/or platforms. Many such devices already include such file system provisions and/or may be easily adopted to support and/or include such provisions. Moreover the virtualization layer may further allow a higher abstraction layer for detaching and hiding the update low level operation.

Before explaining at least one embodiment in detail, it is to be understood that the embodiments are not necessarily limited in their application to the details of construction and the arrangement of the components and/or methods set forth in the following description and/or illustrated in the drawings and/or the Examples. The embodiments described herein are capable of other embodiments or of being practiced or carried out in various ways.

The embodiment described herein may include a system, a method, and/or a computer program product. The computer program product may include a computer readable storage medium (or media) having computer readable program instructions thereon for causing a processor to carry out aspects of the embodiment described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiment described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiment described herein.

Aspects of the embodiment described herein are described with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of generating delta instructions for in-place updating a database based on column oriented change detection in tables of a source and target databases, according to some embodiments described herein. An exemplary process 100 may be executed by a database delta generation system for generating delta instructions which may be used for updating a database stored by one or more devices. In particular, the delta instructions are generated for supporting in-place update of the database in which the database is updated without creating a full copy of the database and replacing the entire database. The delta instructions describe changes between data items stored in the database which may be referred to as a source database and data items stored in a target database which is an updated version of the source database and comprises one or more data items which are changed compared to respective data items in the source database.

Figure 2:
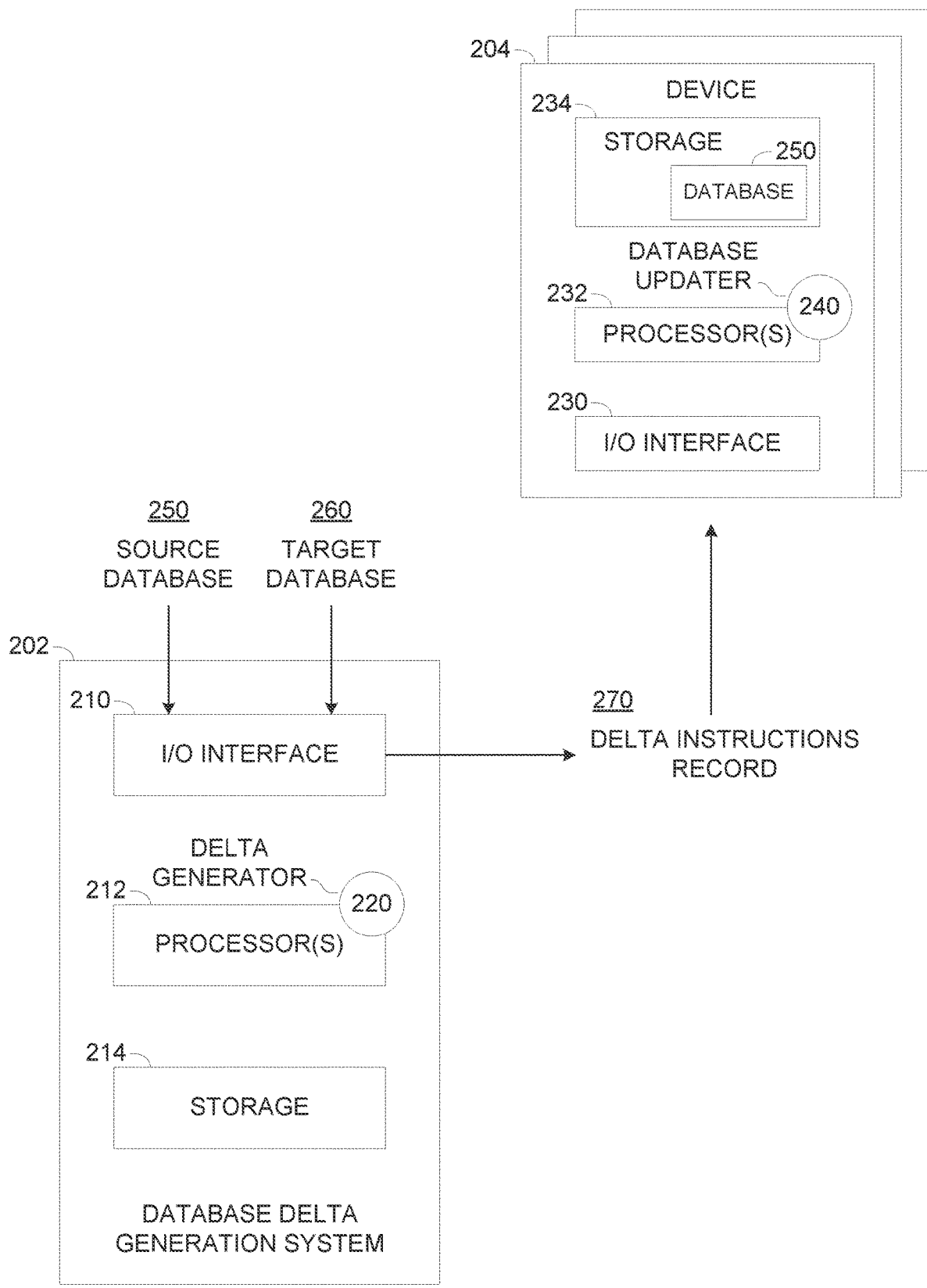
FIG. 2 is a schematic illustration of an exemplary system for generating delta instructions for in-place updating a database based on column oriented change detection in tables of a source and target databases, according to some embodiments described herein.

Reference is also made to FIG. 2, which is a schematic illustration of an exemplary system for generating delta instructions for in-place updating a database based on column oriented change detection in tables of a source and target databases, according to some embodiments described herein. An exemplary database delta generation system 202 may execute a process such as the process 100 for generating a delta instructions record 270 for updating a source database 250 to create a target database 260.

The source database 250 and the target database 260 which is an updated version of the source database 250 are constructed in a plurality of tables comprising a plurality of cells arranged in tuples (rows) and columns. The cells contain data items accessible in the database. One or more of the tables and/or the data items are changed (updated) in the target database 260 compared to the source database 250. One or more of the tables of the source database 250 (and hence of the target database 260) may be a multi-dimensional table. For example, one or more of the cells in one or more of the tables in the source database 250 and respectively in the target database 260 mate be associated (e.g. comprising a link, a reference, a pointer, etc.) with other tables thus forming a hierarchical structure of tables having multiple dimensions. In another example, the source database 250 and the target database 260 may include one or more other databases thus forming multi-dimensional source and target databases. For example, one or more internal Binary Large Objects (BLOBs) which may each be another database (e.g. SQL database) in binary format.

In particular, the source database 250 and its updated version, the target database 260, are navigation map databases, for example, a Navigation Data Standard (NDS) database and/or the like comprising map and navigation data for a geographical area divided to a plurality of limited and typically fixed size tiles, for example, 1 square kilometer (KM). The navigation map databases may include one or more tables in which the tuples correspond to respective tiles of the geographical area and the columns are data layers containing data associated with the respective geographical tiles.

An exemplary NDS database for a certain geographical area divided to a plurality of tiles may be constructed of a table in which the plurality of tuples are tiles of the certain geographical area corresponding to respective limited size region of the certain geographical area each of the columns in each tuple corresponds to one of a plurality of data layers associated with the respective tiles. As such, each data layer column contains data of the respective data layer (of M data layers) which is associated with the respective tile (of N geographical region tiles) as described in table 1 below:

TABLE 1

| Tile ID | Layer 1 Data | Layer 2 Data | ... | Layer M Data |
|---|---|---|---|---|
| Tile 1 | Tile 1 Layer 1 | Tile 1 Layer 2 | ... | Tile 1 Layer M |
| Tile 2 | Tile 2 Layer 1 | Tile 2 Layer 2 | ... | Tile 2 Layer M |
| Tile N | Tile N Layer 1 | Tile N Layer 2 | ... | Tile N Layer M |

Moreover, one or more of the navigation map databases such as the NDS database may typically include multi-dimension tables in which one or more cells in one or more of the table(s) is associated with respective table(s) and/or respective NDS databases as described in table 2 below.

TABLE 2

| Tile ID | Tile Associated Map Data |
|---|---|
| Tile 1 | table1.nds (NDS database 1) |
| Tile 2 | table2.nds (NDS database 2) |
| Tile N | tableN.nds (NDS database N) |

As seen in table 2, each tuple is associated with a respective tile, Tile 1 through Tile N and the cells of the tile's associated map data are links to respective tables, for example, table1.nds through tableN.nds comprising map and/or navigation data of the respective tiles.

The delta instructions record 270, for example, a file, a list, a table and/or the like comprises instructions for applying changes to the tables and/or the data items in the source database 250 to create (form) the target database 260. In particular, the delta instructions record 270 is directed to enable in-place updating of the source database 250 to its updated version, i.e., the target database 260.

The delta instructions record 270 may be delivered to one or more devices 204 which locally store the source database 250, for example, a navigation device, a vehicular control device, a tracking device and/or the like. The navigation device may include, for example, a mobile navigation device, a navigation device of a vehicle (e.g. a land vehicle, an aerial vehicle, a naval vehicle, etc.) and/or the like.

The database delta generation system 202, for example, a computer, a server, a computing node, a cluster of computing nodes and/or the like may comprise an Input/Output (I/O) interface 210, a processor(s) 212 and storage 214.

The I/O interface 210 may include one or more wired and/or wireless interfaces for connecting to one or more networks, systems and/or devices. The I/O interface 210 may include one or more network interfaces, for example, a Local area Network (LAN) interface, a Wireless LAN (WLAN, e.g. Wi-Fi) interface, a cellular interface and/or the like for connecting to one or more networks and/or the internet to communicate with one or more remote resources, for example, a mobile device, a server, a computing node, a cloud resources and/or the like. The I/O interface 210 may further include one or more interfaces and/or ports, for example, a serial bus, a Universal Serial Bus (USB) and/or the like for connecting to one or more attachable devices, for example, an attachable storage device (e.g. flash drive, etc.), a mobile device and/or the like.

The processor(s) 212, homogenous or heterogeneous, may include one or more processors arranged for parallel processing, as clusters and/or as one or more multi core processor(s). The storage 214 used for storing program code (program store) and/or data may include one or more non-transitory persistent storage devices, for example, a Read Only Memory (ROM) component, a hard drive, a Flash array and/or the like. The storage 212 may further include one or more volatile devices, for example, a Random Access Memory (RAM) component, a cache memory and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. For example, the processor(s) 212 may execute a delta generator 220 for executing the process 100 to generate the delta instructions record 270 comprising instructions for updating the source database 250 to create the target database 260. The delta generator 220 may optionally utilize one or more specific hardware elements, for example, a circuit, a component, an Integrated Circuit (IC), an Application Specific Integrated Circuit (ASIC), a Field Programmable Gate Array (FPGA), a Digital Signals Processor (DSP) and/or the like for executing the process 100.

Optionally, the database delta generation system 202 executing the delta generator 220 are provided and/or utilized by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

The device(s) 204 may include an I/O interface 230 such as the I/O interface 210 for receiving the delta instructions record 270, a processor(s) 232 such as the processor(s) 212 and storage 234 such as the storage 214 for storing the local source database 250 of the device 204.

As described for the processor(s) 212, the processor(s) 232 of the device 204 may execute one or more software modules, for example, a database updater 240 for using the delta instructions record 270 to apply the changes in its locally stored source database 250 to create the target database 260.

In particular, the database updater 240 of one or more of the devices 204 may apply in-place update of the source database 250 in which the source database 250 is updated by segments without creating a full copy of the target database 260 and replacing the entire source database 250 with the target database 260. One or more of the devices 204 may be low-end devices having limited computing resources (processing power), storage resources (volatile and/or non-volatile memory capacity) and/or networking resources (bandwidth, latency, limited power for operating communication interface(s), etc.). Therefore applying the in-place update may significantly reduce the computing resources, storage resources and/or networking resources required by the device(s) 204 for updating the source database 250.

Due to the limited resources available to the devices 204 simply copying and replacing the entire source database 250 with the target database 260 may be inefficient and potentially impractical or even impossible. This is because the source database 250 and hence the target database 260 may be large databases thus requiring high storage capacity at the device(s) 204 and major networking resources for transferring the databases to the device(s) 204.

In order to avoid the full database, copy and replace delta instructions methodology is applied in which matches and changes (differences) are identified between the data items in the source database 250 and the target database 260 and instructions are generated to apply these changes in the source database 250 thus updating the source database 250 to the target database 260.

There exist powerful difference detection (diff) algorithm as known in the art, for example, bsdiff for detecting differences in binary files, spiff for detecting textual differences and/or the like for detecting which are highly efficient for identifying differences between 1-dimensional sequences of data. In order take advantage of one or more of these powerful diff algorithms, the data of the source database 250 and the target database 260 may be serialized to create a source stream and a target stream data sequences respectively to which the diff algorithm(s) may be applied to identify the differences between the two streams.

Typical methods and algorithms for updating databases by comparing and matching between the source database 250 and the target database 260 serialize the data items contained in the tables of the source database 250 and the respective tables of the target database 260 in a tuple by tuple (row by row) methodology and apply the diff algorithm(s) to the serialized source and target streams.

In the tuple oriented serialization the data items within each tuple data items of the tables of the database 250 and the respective tables of the target database 260 are concatenated. At the end of a tuple, the first data item of the next tuple is concatenated to the last data item of the pervious tuple and so on. This is similarly applied to tables such that data items contained in a certain table are concatenated to data items of a preceding table. The same approach may be further applied to concatenate data items contained in multi-dimensional tables of multi-dimension source and target databases which may be concatenated according to the order of hierarchy. The sterilization process may be repeated, optionally recursively to traverse the entire database to produce a stream, i.e. a 1-dimensional data sequence concatenating all data items of the database.

The diff algorithm(s) therefore traverses corresponding tuples in the two databases to identify differences (changes) between the respective tuples. However such tuple by tuple traversing may be very inefficient due to the nature of the data items stored in the column fields (cells) of the tuples because the tuple (row) serialization eliminates the information embedded in the column definition, i.e., the type of data in the column and optionally a limited range of data values. For example, a certain table may include tuples having several columns, for example, column(s) consisting of only numbers (e.g. students' ID, students' grades, etc.), column(s) consisting of only strings (e.g. students' first names, students' last names), column(s) comprising audio data items (files), column(s) comprising video data items (files) and/or the like.

Moreover, due to limited computing and storage resources as well as the potentially large size of the source database 250 and the target database 260, the diff algorithm(s) may be unable to compare between the entire source database 250 and the entire target database 260. The diff algorithm(s) may therefore apply a limited size sliding window scheme in which respective limited size parts (segments) of the source database 250 and the target database 260 are compared. The sliding window may advance over the entire source database 250 and the entire target database 260 until all respective tuples in the source database 250 and the target database 260 are compared with each other. the size of the sliding window may be predefined, set and/or adjusted according to one or more operational parameters, for example, a feature of the selected diff algorithm, a resource availability of the database delta generation system 202, a size of the source database 250, a size of the target database 260, a size of one or more data items contained by the source database 250 and/or by the target database 260 and/or the like.

In the tuple (row by row) serialization, the sliding window may therefore span a limited number of tuples (i.e., rows, lines, records) of the respective tables in the source database 250 and the target database 260. The data analyzed in each sliding window state which is arranged by tuples may therefore include data items originating from the plurality of different columns and are thus significantly unrelated with respect to their data type and/or range of data item values. Furthermore, since each window segment may include data items originating from multiple columns, each window segment includes only a very limited number of data items originating from the same columns. Data items originating from the same columns may be therefore highly scattered across multiple different window segments which may further reduce the probability for identifying matching data items and matching sequences.

In contrast, as described in some embodiments herein, serializing the data items contained in the tables of the source database 250 and the respective tables of the target database 260 in a column by column manner may yield source and target streams respectively which comprise highly related data items located in close spatial proximity with each other (i.e. close to each other in the stream) since subsequent data items originate from the same columns.

In the column oriented serialization the data items are concatenated in their column order rather than in their tuple order such that each data item is concatenated to the data item contained in a subsequent cell of the same column. At the end of a column, the data item contained in the first cell of the next column is concatenated to the data item contained in the last cell of the pervious column and so on. This is similarly applied to tables such that data items contained in a certain table are concatenated to data items of a preceding table. This may be further extended to concatenate data items of the multi-dimensional tables of multi-dimension source and target databases which may be concatenated according to the order of hierarchy. The sterilization process may be repeated, optionally recursively to traverse the entire database to produce a stream, i.e. a 1-dimensional data sequence concatenating all data items of the database.

Applying the diff algorithm(s) to the column oriented source and target streams may therefore yield a significantly higher number of matches, in particular, longer matches of respective sequence sections (segments) of the source stream and the target stream and hence a significantly reduced number of differences (changes).

After applying the diff algorithm(s) and identifying the matches and changes (differences) between the source stream and the target stream, the delta generator 220 may generate the delta instructions record 270 which comprises instructions for applying the identified changes to the tables and/or the data items in the source database 250 to update it to the target database 260, i.e., create the target database 260. Naturally the number of delta instructions is directly proportional to the number of changes (differences) identified between the source database 250 and the target database 260 thus identifying more matches may result in less delta instructions thus significantly improving efficiency of the update process and reducing resource utilization for the update process.

The delta instructions may include the following basic instructions:
  Copy—copy one or more data items from the source database 250 to the target database 260.
  Replace—manipulate one or more data items in the source database 250 and update the manipulated data items in the target database 260.
  Insert—insert one or more data items into the target database 260.

By their nature, the Copy, Replace and Insert operations may involve and/or result in different utilization of the computing, storage and/or networking resources. Naturally, the Copy operation inflicts the lowest resources utilization since data items already existing in the source database 250 are simply copied and updated in the target database 260. As such the Copy operation does not involve transfer or storage of new data items which are found in the target database 260 but are not found in the source database 250. The Replace operation requires higher computing and potentially storage resources as some arithmetic, logic and/or other manipulation are done to data items which are found in the source database 250 and the result of the manipulation is updated in the target database 260. The Insert operation is of course the most "expensive" instruction as it requires transferring and temporarily storing new data items which are found in the target database 260 but not found in the source database 250. Such new data items are therefore transferred and stored in their entirety thus consuming computing, storage and/or networking resources.

Each Copy, Replace and Insert instruction has an impact on the size of the delta instructions record 270. However, as described herein before, some instructions, for example, the Insert instruction may have a significantly higher impact on the size of the delta instructions record 270 compared to the Copy instruction and/or the Replace instruction.

Since the Copy instruction is the most resource effective instruction while the Insert instruction is the most resource consuming instruction it is highly desirable to identify as many matches as possible between data items in the source database 250 and the target database 260 using the diff algorithms. This is well addressed in the innovative column oriented serialization, as presented by some embodiments described herein, in which a high correlation exists between subsequent data items.

The efficiency of comparing and matching the column oriented source and target streams compared to the tuple (row) oriented source and target streams may be demonstrated by several examples described herein after.

In a first example, an exemplary source table of an exemplary source database 250 and a respective target table of a respective target database 260 are presented below in tables 3 and 4 respectively.

TABLE 3

| Source Table | |
| --- | --- |
| Integer | String |
| 1 | A |
| 2 | B |
| 3 | C |
| 4 | D |
| . . . | . . . |

TABLE 4

| Target Table | |
| --- | --- |
| Integer | String |
| 10 | A |
| 11 | B |
| 12 | C |
| 13 | D |
| . . . | . . . |

Tuple oriented (row buy row) serialization of the data items of the source table and the target table will yield the following source stream and target stream:
  Source stream: 1*A*2*B*3*C*4*D . . . .
  Target stream: 10*A*11*B*12*C*13*D . . . .

After applying the diff algorithm(s) to identify the changes between the source stream and target stream, a respective delta instructions record 270 generated for applying the identified changes in the first 4 tuples may include the following instructions:
  Insert(10)
  Copy(A)
  Insert(11)
  Copy(B)
  Insert(12)
  Copy(C)
  Insert(13)
  Copy(D)

Serializing the data items of the source table and the target table in column orientation may yield the following source stream and target stream:
  Source stream: 1*2*3*4* . . . . A*B*C*D . . . .
  Target stream: 10*11*12*13 . . . . A*B*C*D . . . .

After applying the diff algorithm(s) to identify the changes between the source stream and target stream, a respective delta instructions record 270 generated for applying the identified changes in the first 4 tuples may include the following instructions:
  Replace([1, 2, 3, 4]+9)
  Copy(A, B, C, D)

As evident, the delta instructions record 270 generated based on the column oriented serialization comprises significantly more efficient operations compared to the tuple (row) oriented serialization since the Copy and Replace operations are significantly more resource utilization efficient compared to the Insert operation.

In a second example, an exemplary source table of an exemplary source database 250 and a respective target table of a respective target database 260 contain students IDs, names and grades as presented below in tables 5 and 6 respectively.

TABLE 5

Source Table

| ID | Name | Grade 2017 |
|---|---|---|
| 12345678 | Nir | 96 |
| 55555555 | Avi | 55 |
| 33333333 | Ron | 77 |
| 43434343 | Eli | 89 |
| 23232323 | Copter | 11 |
| 45454545 | David | 0 |

TABLE 6

Target Table

| ID | Name | Grade 2018 |
|---|---|---|
| 12345678 | Nir | 69 |
| 55555555 | Avi | 56 |
| 33333333 | Ron | 77 |
| 43434343 | Eli | 78 |
| 23232323 | Copter | 0 |
| 67676767 | Shlomo | 100 |

Tuple oriented (row buy row) serialization of the data items of the source table and the target table will yield the following source stream and target stream:

Source stream:
12345678*Nir*96*55555555*Avi*55*33333333*Ron*77*43434343*Eli*89*2323232*Copter*11*45454545*David*0

Target stream:
12345678*Nir*69*55555555*Avi*56*33333333*Ron*77*43434343*Eli*78*2323232*Copter*0*45454545*Shlomo*100

After applying the diff algorithm(s) to identify the changes between the source stream and target stream, a respective delta instructions record 270 generated for applying the identified changes may include the following instructions:

Copy(ID1, Name1)
Replace(Grade1[-27])
Copy(ID2, Name2)
Replace(Grade1[+1])
Copy(ID3, Name3, ID4, Name4)
Replace(Grade4[-11])
Copy(ID5, Name5)
Replace(Grade5[+11])
Insert('67676767', 'Shlomo', 100)

Serializing the data items of the source table and the target table in column orientation may yield the following source stream and target stream:

Source stream:
12345678*55555555*33333333*43434343*23232323*45454545 . . . . Nir*Avi*Ron*Eli*Copter*David . . . . 96*55*77*89*11*0

Target stream:
12345678*55555555*33333333*43434343*23232323*67676767 . . . . Nir*Avi*Ron*Eli*Copter*Shlomo . . . . 69*56*77*78*0*100*

After applying the diff algorithm(s) to identify the changes between the source stream and target stream, a respective delta instructions record 270 generated for applying the identified changes may include the following instructions:

Copy(ID1, ID2, ID3, ID4, ID5,)A, B, C, D)
Insert('67676767')
Copy(Name1, Name2, Name3, Name4, Name5,)
Insert('Shlomo')
Replace([Grade1, Grade2, Grade3, Grade4, Grade5, Grade6]+[-27, +1, 0, -11, +11, +100])

As evident, the delta instructions record 270 generated based on the column oriented serialization comprises significantly more efficient operations compared to the tuple (row) oriented serialization since longer matching sequences are found between the source and target streams and hence there are significantly less operations and multiple sequential Copy operations are instructed thus further reducing the resource utilization and/or update time.

In a third example, an exemplary source table of an exemplary source database 250 and a respective target table of a respective target database 260 contain building IDs pictures files associated with the building IDs and voice playback files associated with the building IDs as presented below in tables 7 and 8 respectively.

TABLE 7

Source Table

| Building ID | Picture | Voice |
|---|---|---|
| 1 | Pic1 | Voice1 |
| 2 | Pic2 | Voice2 |
| 3 | Pic3 | Voice3 |
| 4 | Pic4 | Voice4 |
| 5 | Pic5 | Voice5 |
| 6 | Pic6 | Voice6 |

TABLE 8

Target Table

| Building ID | Picture | Voice |
|---|---|---|
| 1 | Pic6 | Voice3 |
| 2 | Pic5 | Voice2 |
| 3 | Pic4 | Voice1 |
| 4 | Pic3 | Voice4 |
| 5 | Pic2 | Voice6 |
| 6 | Pic1 | Voice5 |

As described herein before, the diff algorithm(s) may apply a limited size sliding window for comparing between the source and target streams. Since the size (volume) of the picture files and the voice files may be significantly large the sliding window of the diff algorithm(s) processes at any given time may encompass only a limited number of these files.

Assuming the size of the picture files and the voice files is substantially similar, tuple oriented (row by row) serialization of the data items of the source table and the target table will yield the following source streams and target streams:

$1^{st}$ segment ($1^{st}$ window) of the source stream:
Pic1*Voice1*Pic2*Voice2*Pic3*Voice3
$2^{nd}$ segment ($2^{nd}$ window) of the source stream:
Pic4*Voice4*Pic5*Voice5*Pic6*Voice6
$1^{st}$ segment ($1^{st}$ window) of the target stream:
Pic6*Voice3*Pic5*Voice2*Pic4*Voice1
$2^{nd}$ segment ($2^{nd}$ window) of the target stream:
Pic3*Voice4*Pic2*Voice6*Pic1*Voice5

Due to the limited number of data items compared in each window the diff algorithm(s) may fail to efficiently identify matches between the picture files and/or voice files which are found in both the source table and in the target table but may be included in different compared windows.

After applying the diff algorithm(s) to identify the changes between the source stream and target stream in the 1$^{st}$ window, a respective delta instructions record 270 generated for applying the identified changes may include the following instructions:

Insert(Pic6)
Copy(Voice3)
Insert(Pic5)
Copy(Voice2)
Insert(Pic4)
Copy(Voice1)

For the 2$^{nd}$ window, a respective delta instructions record 270 generated for applying the identified changes may include the following instructions:

Insert(Pic4)
Copy(Voice4)
Insert(Pic2)
Copy(Voice6)
Insert(Pic1)
Copy(Voice5)

Serializing the data items of the source table and the target table in column orientation may yield the following source stream and target stream:

1$^{st}$ segment (1$^{st}$ window) of the source stream:
Pic1*Pic2*Pic3*Pic4*Pic5*Pic6
2$^{nd}$ segment (2$^{nd}$ window) of the source stream:
Voice1*Voice2*Voice3*Voice4*Voice5*Voice6
1$^{st}$ segment (1$^{st}$ window) of the target stream:
Pic6*Pic6*Pic4*Pic3*Pic2*Pic1
2$^{nd}$ segment (2$^{nd}$ window) of the target stream:
Voice3*Voice2*Voice1*Voice4*Voice6*Voice5

After applying the diff algorithm(s) to identify the changes between the source stream and target stream, a respective delta instructions record 270 generated for applying the identified changes may include the following instructions:

Copy(Pic6, Pic5, Pic4, Pic3, Pic2, Pic1)

For the 2$^{nd}$ window, a respective delta instructions record 270 generated for applying the identified changes may include the following instructions:

Copy(Voice3, Voice2, Voice1, Voice4, Voice6, Voice5)

As evident, the delta instructions record 270 generated based on the column oriented serialization comprises significantly more efficient operations compared to the tuple (row) oriented serialization since longer matching sequences are found between the source and target streams and hence there are significantly less operations and multiple sequential Copy operations are instructed thus further reducing the resource utilization and/or update time.

In a fourth example, an exemplary source database 250 and a respective target database 260 comprise a map database such as, for example, the NDS database comprising map and/or navigation data arranged as described in table 1.

Tuple oriented (row buy row) serialization of the data items of the source database 250 and the target database 260 will yield the following exemplary source stream and target stream (it should be noted that these are exemplary streams only and many other may be generated for the exemplary NDS database outlined in table 1):

Source stream:
Tile1ID*Tile1Layer1*Tile1Layer2*Tile1Layer3* . . . * Tile1LayerM
Target stream:
Tile1ID*Tile1Layer1*Tile1Layer2*Tile1Layer3* . . . * Tile1LayerM Each layer column may contain data items that describe values of a certain attribute (data 30 type) associated with the respective tiles. Such attributes may include, for example, terrain type (e.g. urban, rural, countryside, etc.), road infrastructure, street names, house numbers, point of interest, traffic signs, speed limits, toll road rates, photographs of the respective tile (e.g. ground level photos, satellite photos, etc.), voice files (e.g. street names for navigation guidance, etc.) and/or the like.

Assuming there are only very minor changes in only a few respective data items in several data layers associated with Layer1. In such scenario, applying the diff algorithm(s) to identify the changes between the source stream and target stream, specifically within the limited size window employed by the diff algorithm(s) may yield relatively few matches between the respective data items which may not amount to substantial matching sequences.

Serializing the data items of the source database 250 and the target database 260 in column orientation may yield the following exemplary source stream and target stream:
Source stream:
Tile1Layer1*Tile2Layer1*Tile3Layer1*Tile4Layer1*...* TileNLayer1
Target stream:
Tile1Layer1*Tile2Layer1*Tile3Layer1*Tile4Layer1*...* TileNLayer1

Applying the diff algorithm(s) to the column oriented source and target streams may yield a substantially high number of matching data items which may yield long matching sequences since there may be only minor changes between respective data items in the columns.

When generating the delta instructions for the identified changes, the Copy and Replace resource effective delta instructions may be used much more frequently since the data items in the source and target streams originating from a common column are of the same type thus highly correlated and highly probable to be manipulated using simple Replace instruction compared to the tuple oriented streams in which subsequent data items are not correlated. Moreover, it is highly probable that a changed data item of the Layer1 data of a certain tile will have a value which is already available in the Layer1 data of another tile and the Copy delta instruction may be used.

The delta instructions record 270 generated based on the column oriented serialization may therefore comprise significantly more efficient operations compared to the tuple (row) oriented serialization due to the longer matching sequences and the ability to frequently use the Copy and Replace delta instructions.

As shown at 102, the process 100 starts with the delta generator 220 obtaining the source database 250 and the target database 260 which is an updated version of the source database 250 and hence includes one or more data items which are changed (different) compared to the respective data items in the source database 250.

The delta generator 220 may obtain the source database 250 and the target database 260 from one or more sources. For example, the delta generator 220 may receive the source database 250 and/or the target database 260 from one or more of the remote resources via one or more of the networks via the I/O interface 210. In another example, the delta generator 220 may obtain the source database 250 and/or the target database 260 from one or more of the attachable devices connected to one or more of the interfaces and/or ports provided by the I/O interface 210. In another example, the delta generator 220 may retrieve the source database 250 and/or the target database 260 from storage, specifically the storage 214 in which the source database 250 and/or the target database 260 are stored after previously received. Moreover, the source database 250 and/or the target database 260 may be installed in the database delta generation system 202, specifically in the storage 214 such that the delta generator 220 may operate directly on the installed source database 250 and/or the target database 260 to generate the delta instructions record 270.

Optionally, in case the source database 250 and the target database 260 and/or part thereof have different representations, the delta generator 220 manipulates the source database 250 and/or the target database 260 to have a common representation. For example, in case the source database 250 and/or the target database 260 are compressed, the delta generator 220 may apply one or more tools and/or algorithms to decompress them. In another example, in case one or more segments and/or BLOBs in the source database 250 and/or the target database 260 are compressed, the delta generator 220 may decompress them. In another example, the source database 250 and/or the target database 260 may be encoded and/or encrypted using one or more encoding schemes. In such case the delta generator 220 may apply one or more tools and/or algorithms to decode the source database 250 and/or the target database 260. In another example, specifically to support text oriented diff algorithm(s) configured to identify changes (differences) between textual sequences of strings, the source database 250 and/or the target database 260 may be converted to textual representations, for example, a Comma Separated Values (CSV) file and/or the like.

As shown at 104, the delta generator 220 creates a column oriented source stream concatenating the data items contained in the cells of the tables of the source database 250 as described herein above.

As described herein before, the delta generator 220 a source stream comprising the data items of the source database 250 by concatenating the data items included in the tables of the source database 250 in column wise order. As such, the delta generator 220 concatenates each data item contained in a respective cell of a table in the source database 250 to a data item contained in a cell preceding the respective cell in the same column of the respective cell. The delta generator 220 further extends the source stream by concatenating the data item in the first cell of a column to the data item contained in the last cell of a preceding column. Similarly, the delta generator 220 extends the source stream by concatenating the data item in the first cell of a first column in a table to the data item contained in the last cell of the last column in a preceding table in the source database 250. In case of a multi-dimension database, the delta generator 220 may recursively traverse one or more databases which may be included in the source database 250 and respectively in the target database 260 to concatenate the data items encapsulated in the embedded (lower level) database(s) to the data items of the parent database in a hierarchical order.

By creating the source stream the delta generator 220 converts the multi-dimensional (2-dimensions and/or higher dimension) source database 250 to the 1-dimensional source stream concatenating the data items contained in the cells of the tables of the source database 250 in column wise order which may processed highly efficiently by the diff algorithm(s).

As shown at 106, the delta generator 220 creates a column oriented target stream comprising the data items of the target database 260 by concatenating the data items included in the tables of the target database 260 in column wise order as described for the source stream created for the source database 250. Similarly to the source stream, by creating the target stream the delta generator 220 converts the multi-dimensional (2-dimensions and/or higher dimension) target database 260 to the 1-dimensional target stream concatenating the data items contained in the cells of the tables of the target database 260 in column wise order which may processed highly efficiently by the diff algorithm(s).

As shown at 108, the delta generator 220 applies one or more of the diff algorithms to identify changes (differences) between the source stream and the target stream.

As shown at 110, the delta generator 220 creates the delta instructions record 270 comprising delta instructions dictating the delta operations (e.g. Copy, Replace, Insert) required for applying the changes in the source database 250 to create the target database 260 which is the updated version of the source database 250.

Optionally, prior to creating the source stream and the target stream, the delta generator 220 removes one or more tuples which are substantially identical in the source database 250 and in the target database 260. The delta generator 220 may use one or more tools, methods, techniques and/or algorithms as known in the art, for example, sqldiff and/or the like for detecting changes (differences) between the multi-dimensional (two dimensions and higher) databases such as the source database 250 and the target database 260. As such, the delta generator 220 may detect changes (differences) between respective tuples (rows) of respective tables in the source database 250 and in the target database 260, i.e., the delta generator 220 may detect data items which are changed (updated) in cells (fields) of tables in the target database 260 compared to the respective data items in the source database 250.

Tuples which are determined as identical may be removed and not included by the delta generator 220 in creation of the source stream and the target stream. The delta generator 220 may update the delta instructions record 270 to indicate which tuples are identical and should be left as is in the source database 250. Tuples which are determined as substantially similar, i.e. in which only significantly few changed data items are detected in the target database 260 compared to the source database 250 may also be removed and not included by the delta generator 220 in creation of the source stream and the target stream. The delta generator 220 may update the delta instructions record 270 to include delta instructions for updating the substantially similar tuples in the source database 250 to replace the few changed data items.

This may result in reduced size source database 250 and reduced size target database 260 from which respective tuples are removed thus reducing the length of the respective source stream and target stream created from the reduced size source database 250 and target database 260. This may significantly reduce the computation resources required for comparing the source stream and target stream.

Reducing the size of the source stream and the data stream to include only tuples which are significantly changed in the target database 260 compared to the source database 250 may significantly reduce the size of the delta instructions record 270 thus requiring reduced computing, storage and/or networking resources for delivering it to the device(s) 204. However, more importantly, by focusing the delta instructions to the significantly changed tuples may significantly reduce the number of delta instructions in the delta instructions record 270 thus affecting less tuples in the source database 250 for updating it to the target database 260. This may further reduce the computing and/or storage resources required by the device(s) 204 to apply the delta instructions for updating their locally stored source database 250.

Optionally, prior to creating the source stream and the target stream, the delta generator 220 reorders one or more of the columns with respect to other columns in the source database 250 and respectively in the target database 260 according to one or more attributes of the data items contained in the column cells. As result, after the reordering the data items of a certain column may be concatenated to the data items of a reordered column comprising data items having one or more similar attributes as the data items of the certain column. The delta generator 220 updates delta instructions record 270 to indicate of all such reordering operations.

For example, the delta generator 220 may reorder two or more columns to follow each other in case these columns comprise data items of the same data type, for example, integer, string, picture, voice, video and/or the like. In another example, the delta generator 220 may reorder two or more columns to follow each other in case these columns comprise data items of the same type and in a substantially similar range. For example, assuming two columns comprise data items of integer type which are in the same range, for example, 0 to 100, the delta generator 220 may move these columns to be adjacent to each other. In another example, the delta generator 220 may reorder two or more columns to follow each other according to one or more logical relations identified between the columns. For example a column comprising data items of a "first name" type may be moved to be adjacent to a column comprising data items of "middle name" type and/or a column comprising data items of "last name" type.

Optionally, prior to creating the source stream and the target stream, the delta generator 220 reorders one or more columns across tables. One or more columns of a first table may include one or more reference keys (a link, a reference, a pointer, etc.) to one or more referenced columns in one or more other tables. As such the data items contained in the cells of the referencing column and in the referenced column(s) may share one or more similar attributes and may therefore have high correlation with each other thus significantly increasing the probability of longer matching data items and matching sequences of concatenated data items. The delta generator 220 updates delta instructions record 270 to indicate of all such reordering operations.

For example, assuming the data items contained in the cells of a first column in an exemplary Table 1 presented in Table 9 below serve as a primary key for another exemplary Table 2 presented in Table 9 below.

TABLE 9

Table T1

| Student Name | Student ID | Gender | Address |
|---|---|---|---|
| Nir | 12345678 | M | |
| Avi | 98765432 | M | |
| Ron | 31124567 | M | |
| ... | ... | | |

Table T2

| Student Name | Grade Mathematics | Grade History | Grade Music | Grade Average |
|---|---|---|---|---|
| 12345678 | 87 | | | |
| 98765432 | 75 | | | |
| 31124567 | 92 | | | |
| ... | | | | |

As seen the data items of the "Student ID" column in Table 1 serve as primary keys for Table 2. As such, in order to access the "Grade Mathematics" of "Nir" presented in Table 1, one must first access the "Student ID" column in Table 1 using the student name "Nir" as key to retrieve the student ID of "Nir" which is the primary key for accessing Table 2 to retrieve the "Grade Mathematics" of "Nir". In such case the delta generator 220 may reorder the "Student ID" in Table 1 to precede the primary key column of Table 2 such that when creating the source stream and the data stream, the data items of the primary key column of Table 2 are concatenated subsequently to the data items of the "Student ID" column in Table 1.

Creating the source and target streams after reordering the columns according to the data items attributes may significantly increase the correlation between the concatenated data items which may further increase the number of matches and/or length of matching sequences found by the diff algorithm(s) between the source stream and the target stream. As described herein before, longer matches and fewer changes may translate to fewer delta instructions required for updating the source database 250 to the target database 260 thus increasing efficiency (e.g. time, complexity) of the update process. This in turn may significantly reduce utilization of the computing, storage and/or networking resources required for delivering and applying the changes since fewer delta operations may be required and/or resource efficient delta Copy and/or Replace operations may be used instead of the more resource consuming Insert delta operation.

As shown at 110, the delta generator 220 outputs the delta instructions record 270 which may be delivered to one or more of the devices 204 which may apply the delta instructions defined by the delta instructions record 270 to update their locally stored source database 250 to create the target database 260. In particular, the device(s) 204 may apply the delta instructions to update in-place their locally stored source database 250.

According to some embodiments described herein one or more of the devices 204 which receive the delta instructions record 270 may initiate the database updater 240 to, using the delta instructions record 270, update in-place the source database 250 locally stored in their storage 234 to the target database 260.

Figure 3:
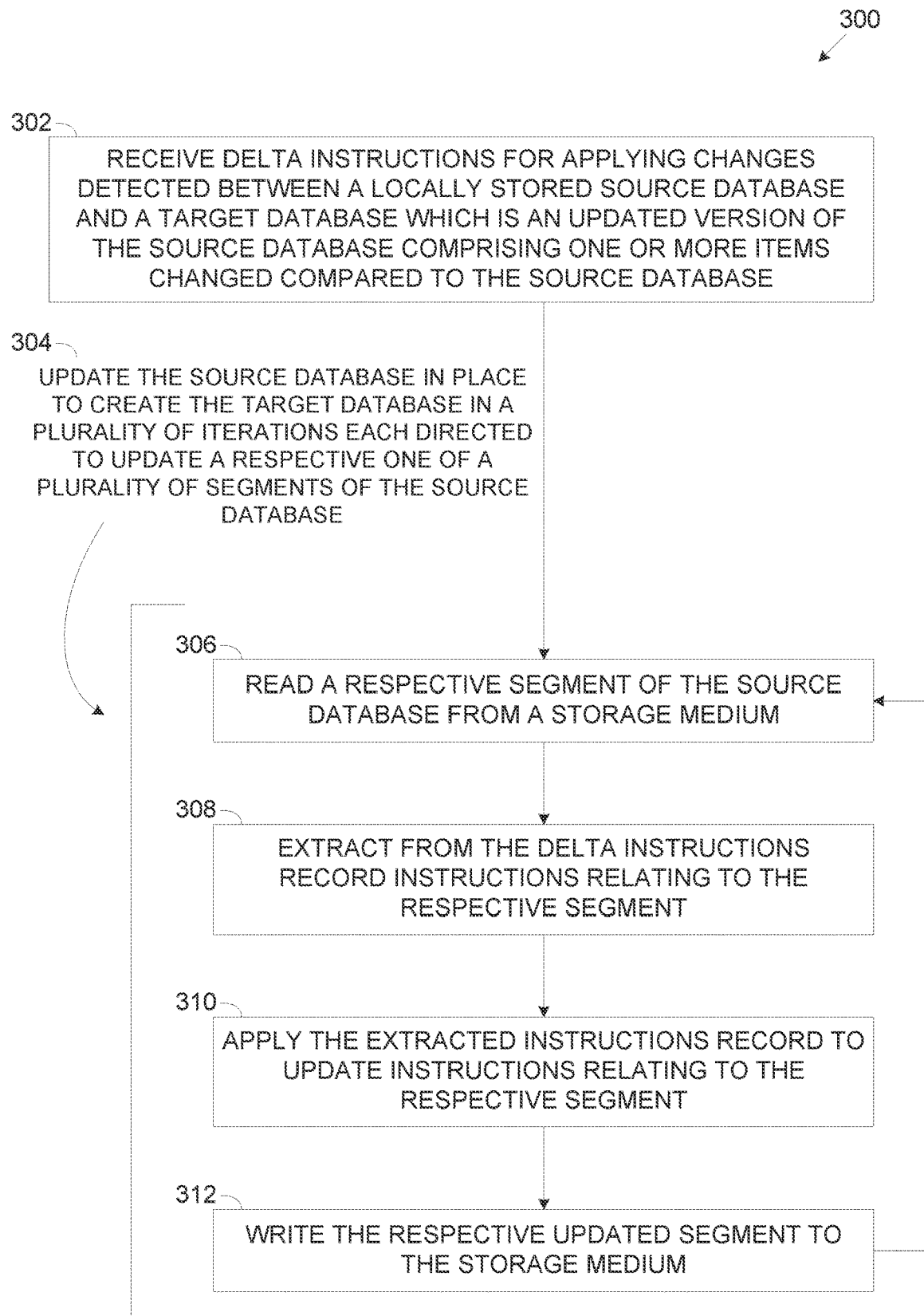
FIG. 3 is a flowchart of an exemplary process of updating a database in-place using delta instructions generated based on column oriented change detection in tables of a source and target databases, according to some embodiments described herein.

Reference is now made to FIG. 3, which is a flowchart of an exemplary process of updating a database in-place using delta instructions generated based on column oriented change detection in tables of a source and target databases, according to some embodiments described herein. An exemplary process 300 may be executed by a database updater such as the database updater 240 executed by a device such as the device 204 for updating in-place a locally stored source database such as the source database 250 to a target database such as the target database 260 using a delta instructions record such as the delta instructions record 270. As described herein before, the delta instructions record 270 comprises delta instructions for updating the source database 250 to the target database 260 which are generated based on a column oriented comparison between respective data items contained in the source database 250 and in the target database 260.

In particular, the database updater 240 executes the process 300 for updating one or more map source databases such as the source database 250.

The process 300 is an iterative process comprising a plurality of iterations each applied for a respective one of a plurality of segments of the source database 250. The device 204 may be a low end device comprising limited storage resources, specifically, limited volatile memory resources available in a storage such as the storage 234. Therefore, by segmenting the source database 250 the database updater 240 may update a single segment at a time may thus requiring limited memory volatile memory for temporarily storing the segment, manipulating it and writing it back into non-volatile (persistent) memory of the storage 234.

The source database 250 may be divided to the plurality of segments according to a predefined fixed segment size. However, the source database 250 may also be divided to the plurality of segments according to one or more operational parameters of the device 204 and/or according to one or more attributes of the source database 250 specifically of the tables of the source database 250. For example, the segments may correspond to columns of the tables of the source database 250. In another example, the segments may correspond to elements contained in the source database 250, for example, a BLOB and/or the like. In another example, the segments may correspond to tables of the source database 250. In another example, the segment may be adapted according to a buffer size available in the storage 234 of the device 204, in particular volatile memory of the device 204.

In each of the iterations a respective segment is retrieved from a storage medium of the device 204, for example, storage such as the storage 234, manipulated according to the delta instructions relating to the respective segment to create a respective target segment which is written back to the storage medium. Specifically, in each iteration, a respective partial column oriented source stream is created for the respective segment of the locally stored source database 250, the delta instructions applicable for the respective partial source stream are applied to it to create a respective partial target stream which is restored to create the respective target segment that is written back to the storage medium.

As shown at 302, the process 300 starts with the database updater 240 receiving the delta instructions record 270. The database updater 240 may receive the delta instructions record 270 from one or more sources. For example, the database updater 240 may receive the delta instructions record 270 via one or more of the networks via the I/O interface 230 from one or more of the remote resources, for example, the database delta generation system 202 and/or the like. In another example, the database updater 240 may receive the delta instructions record 270 from one or more of attachable devices connected to one or more of the interfaces and/or ports provided by the I/O interface 230. In another example, the database updater 240 may receive the delta instructions record 270 from its storage 234 in which the delta instructions record 270 are stored after previously received.

As shown at 304, the database updater 240 conducts a plurality of iterations each comprising steps 306, 308, 310 and 312. The iterations may be repeated until the entire source database 250 is updated to create the target database 260 and/or a predefined part thereof.

As shown at 306, the database updater 240 reads (retrieves) a respective segment of the source database 250 from the storage 234 persistent memory into a volatile memory buffer.

The database updater 240 may further convert the data items contained in the retrieved segment to a column oriented source stream such as the source stream created by a delta generator such as the delta generator 220 as described in step 106 of the process 100. As the database updater 240 processes the respective segment of the source database 250, the source stream created by the database updater 240 is a partial column oriented source stream corresponding to the respective segment.

Optionally, the database updater 240 manipulates the representation of the locally stored source database 250, in particular the representation of the respective segment in case the representation is different from the representation of the source database 250 processed by the delta generator 220 to create the source stream used to create the delta instructions record 270. For example, in case the locally stored source database 250 is compressed, the database updater 240 may apply one or more tools and/or algorithms to decompress the respective segment of the locally stored source database 250. In another example, assuming the locally stored source database 250 is encoded and/or encrypted the database updater 240 may decode and/or decrypt the respective segment. In another example, in case the delta generator 220 originally converted the source database 250 to the textual representation (e.g. CSV), the database updater 240 may similarly convert the data items contained in the respective segment to the same textual representation.

The database updater 240 may further manipulate the ordering of one or more columns included in the respective segment to comply with similar manipulation conducted by the delta generator 220 to the columns of the source database 250 prior to generating the source stream. For example, assuming the delta generator 220 applied in table reordering and/or cross tables reordering of one or more columns, the database updater 240 may apply the same reordering as applicable for the respective segment. This is done to ensure compliance of the column oriented concatenated data items between the partial column oriented source stream and the appropriate section of the source stream created by the delta generator 220 for the source database 250. The database updater 240 may extract the information indicating these manipulations from the delta instructions record 270 which was originally updated by the delta generator 220 to reflect this manipulation(s).

As shown at 308, the database updater 240 extracts the delta instructions relating (applicable) to the respective segment from the delta instructions record 270.

As shown at 310, the database updater 240 applies the delta operations indicated by the delta instructions to the respective segment, specifically to the partial column oriented source stream created for the respective segment thus updating the respective segment to create a respective segment of the target database 260.

As shown at 312, after the database updater 240 applies the related delta instructions to the respective segment and creates the respective target segment, the database updater 240 writes the updated segment back into the storage 234, specifically to the persistent storage 234. Moreover, since the respective updated segment may be in stream form (sequence), the database updater 240 may first convert the updated partial stream to the original format of the target database 260 prior to writing the respective updated segment to the storage 234.

After traversing the entire locally stored database 250 and applying all changes as directed by the delta instructions record 270, the source database 250 is fully updated to reflect the target database 260, i.e. the target database 260 is created in place of the source database 250.

The database updater 240 may further execute the iterations on the fly while receiving the delta instructions record 270. This is may be done since the delta instructions record 270 created by the delta generator 220 for the changes (differences) identified between the source stream and the target stream may be applied on segment (chunk) basis over segments (chunks) of the source stream. The database updater 240 may therefore extract currently received applicable delta instructions for the delta instructions record 270 which reception is still in progress and apply the extracted delta instructions to the related segment after converting it to the partial column oriented source stream.

In this scenario, the database updater 240 may extract at least some delta instructions relating to a certain segment from the delta instructions record 270 which is currently being received at the device 204. The database updater 240 may access as files one or more segments to which the extracted delta instructions apply and may update this segment(s) according to the extracted delta instructions. After updated, the database updater 240 may write the updated segments back to storage 234.

While for read operations the database updater 240 may randomly access segments of the locally stored database 250 stored in the storage 234, the database updater 240 may only write the segments serially (sequentially) back to the storage 234 to create an updated respective segment of the target database 260. This may not present an issue since the buffer containing the updated segment relates to a complete column, element and/or table which may be serially written in the target database 260.

Optionally, the database updater 240 simultaneously processes a plurality of segments, for example, columns (read as files) read into the buffer using one or more multi-processing implementations and/or architectures, for example, multi-threading, multi-tasking and/or the like. Such implementations may be supported by one or more synchronization mechanisms which allocate buffers for each of the segments processed simultaneously.

In order to prevent releasing (and writing back) uncompleted segments, the database updater 240 is configured to process the respective segment corresponding to a respective column, table and/or element and release the buffer only upon completion of processing of the entire segment.

According to some embodiments described herein the locally stored source database 250 is mounted as a virtual file system using an abstraction layer in which the tables may be regarded as folders (directories) and the columns may be regarded as files containing the data items stored in the cells (fields) of the columns. The abstraction layer may include one or more software modules for abstracting the tuples and tables by emulating access to the tuples and tables as access to files and directories respectively. The access supported by the abstraction layer may include, for example, read access, write access and/or the like.

For example, the database updater 240 may utilize a FUSE abstraction layer applied at the device 204 to serve as a virtualization layer for serializing the segments updated in each of the iterations of the process 300 to create the partial source streams. In this implementation the database updater 240 may have full random read and write access to the locally stored source database 250 accessed as the virtual file system.

In such embodiments, the database updater 240 executing the process 300 may access the source database 250 as a file system such that in each iteration the database updater 240 reads (retrieves) the respective segment, for example, a column, a table, an element and/or the like as a file and load it into the volatile memory buffer for updating it according to the delta instructions and then write the updated buffer back into the virtual file system.

When updating the locally stored source database 250 on the fly and since the locally stored source database 250 may be accessed as a file system supporting both random read and random write, the database updater 240 may randomly access any of the segments of the source database for which the extracted delta instructions are applicable.

An exemplary flow which may be applied by the database updater 240 for updating a certain segment of the locally stored source database 250 to create a respective updated segment of the target database 260 is presented in pseudocode excerpt 1 below. The software module conducting each operation is stated in the square parenthesis preceding the operation.

Pseudocode Excerpt 1:
1. [database updater 240] get the file list
2. [abstraction layer] run.schema command to get all table names
3. [database] run internal query on master table
4. [abstraction layer] translate the data into filesystem metadata where each table is a folder and each column is a file internal query on master table
5. [database updater 240] open the file at A/a for read access
6. [abstraction layer] retuen success
7. [database updater 240] read bytes 0-1000 from A/a
8. [abstraction layer] run select a from A
9. [database] access internal pages and records and return their data as text
10. [abstraction layer] buffer the output and stop the command when output text is 1000 bytes
11. [database updater 240] apply the delta instructions on the bytes received An exemplary flow which may be applied by the database updater 240 for random read access is presented in pseudocode excerpt 2 below where L is the line number which was most recently read and R is a residue of bytes which are not part of a complete line. In this exemplary code segment the database updater 240 reads 1000 bytes from offset 0 and the result is 990 bytes read from the first 20 lines and 10 bytes read from the $21^{st}$ line. The values of L and R are updated accordingly, L=21 and R=10. In the subsequent read access, the database updater 240 re-reads line 21 but will not return the first 10 bytes to the user as they were returned in the preceding cycle (iteration). The database updater 240 may maintain an internal buffer of the bytes required for worst case scenario such that when the database updater 240 reads bytes which are already read in a previous iteration, the database updater 240 may retrieve them from the internal buffer, read from DB is only one direction. The software module conducting each operation is stated in the square parenthesis preceding the operation.

Pseudocode Excerpt 2

1. [database updater 240] read bytes 1000 to 2000 from A/a
2. [abstraction layer] (assuming last read endede at 1000) run "select a from A limit L"
3. [database] run internal query
4. [abstraction layer] buffer the output and stop after 1000+R bytes return the 1000 bytes after R bytes
5. [database updater 240] apply the delta instructions on the bytes received An exemplary flow which may be applied by the database updater 240 for sequential write access is presented in pseudocode excerpt 3 below. The software module conducting each operation is stated in the square parenthesis preceding the operation.

Pseudocode Excerpt 3

1. [database updater 240] apply the delta instructions on all columns simultaneously
2. [database updater 240] write 100 bytes to A/a
3. [abstraction layer] insert 100 bytes to A_a buffer
4. [abstraction layer] check if there is at least one element in each file (column) in folder (table) A
5. [abstraction layer] if yes:
   create one tuple (row) by running insert into tablequery
   release the written elements from buffer
   go back to previous phase until there are missing elements in the row
   if no:
   do nothing
   if the buffer allocated for $A_a$ is full then block the process until other
   processes executign simultanously emprty the buffer
6. [database] low level insert of records into pages in the storage 234

It is expected that during the life of a patent maturing from this application many relevant systems, methods and computer programs will be developed and the scope of the term diff algorithm is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments described herein may be presented in a range format. It should be understood that the description in range format is merely for convenience and brevity and should not be construed as an inflexible limitation on the scope of the embodiments described herein. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features of the embodiments described herein, which are, for clarity, described in the context of separate embodiments, may also be provided in combination in a single embodiment. Conversely, various features of the embodiments described herein, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are 30 hereby incorporated herein by reference in its/their entirety.

What is claimed is:

1. A method of generating a delta instructions record for updating a source database in-place, comprising:
   using at least one processor for:
      obtaining a plurality of source data items contained in a plurality of cells of a plurality of tables of a source database, each of the plurality of tables is organized in a plurality of tuples and a plurality of columns;
      creating a column oriented source stream serializing the plurality of source data items by concatenating a source data item of each cell of each of the plurality of columns to a preceding source data item of a cell preceding the respective cell in the respective column;
      obtaining a plurality of target data items contained in a plurality of tables of a target database which is an updated version of the source database comprising at least one data item changed compared to a respective source data item;
      creating a column oriented target stream serializing the plurality of target data items such that each target data item is concatenated to a preceding target data item;
      generating a delta instructions record comprising instructions for applying changes detected between the source database and the target database by comparing between the source stream and the target stream;
      outputting the delta instructions record which is used to update the source database to the target database.

2. The method of claim 1, further comprising at least one of the plurality of tables is a multi-dimension table in which at least one cell is associated with another table.

3. The method of claim 1, wherein the source database is a navigation map database comprising at least one table in which the plurality of tuples are tiles corresponding to respective geographical regions and each of the plurality of columns is a data layer comprising data associated with the respective geographical region.

4. The method of claim 3, further comprising the at least one table is a multi-dimension table in which each tile is associated with a plurality of data layers.

5. The method of claim 1, further comprising manipulating a representation of at least one of the source database and the target database to create a common representation for the source database and the target database.

6. The method of claim 1, further comprising analyzing the source database and the target database to identify at least one identical tuple in the source database and the target database, the at least one identical tuple is discarded from the source database and from the target database prior to generating the source stream and the target stream respectively.

7. The method of claim 1, wherein a source data item of a first cell of at least one column is concatenated in the source stream to a preceding source data item of a last cell of a column preceding the at least one column in at least one of the plurality of tables of the source database, and a target data item of the first cell of the at least one column is concatenated in the target stream to the preceding target data item of the last cell of the column preceding the at least one column in the at least one of the plurality of tables of the target database.

8. The method of claim 7, further comprising reordering at least one column in the source database and in the target database prior to generating the source stream and the target stream respectively according to a type of the data items of the at least one column such that the first cell of the at least one column is concatenated in the source stream and in the target stream respectively to the last cell of a reordered preceding column.

9. The method of claim 1, further comprising cross table reordering at least one column in the source database and in the target database across tables prior to generating the source stream and the target stream respectively, the first cell of at least one referenced column is concatenated in the source stream and in the target stream respectively to the last cell of a referencing column comprising a reference key to the at least one referenced column.

10. The method of claim 1, wherein the instructions in the delta instructions record include a copy instruction, a replace instruction and an insert instruction, wherein:
   the copy instruction is directed to copy a source data item from the source database,
   the replace instruction is directed to replace a source data item with another data item, and the insert instruction is directed to insert a target data item from the target database.

11. A system for generating a delta instructions record for updating a source database in-place, comprising:
at least one processor executing a code, the code comprising:
code instructions to obtain a plurality of source data items contained in a plurality of cells of a plurality of tables of a source database, each of the plurality of tables is organized in a plurality of tuples and a plurality of columns;
code instructions to create a column oriented source stream serializing the plurality of source data items by concatenating a source data item of each cell of each of the plurality of columns to a preceding source data item of a cell preceding the respective cell in the respective column;
code instructions to obtain a plurality of target data items contained in a plurality of tables of a target database which is an updated version of the source database comprising at least one data item changed compared to a respective source data item;
code instructions to create a column oriented target stream serializing the plurality of target data items such that each target data item is concatenated to a preceding target data item;
code instructions to generate a delta instructions record comprising instructions for applying changes detected between the source database and the target database by comparing between the source stream and the target stream; and
code instructions to output the delta instructions record which is used to update the source database to the target database.

12. A method of updating a source database in-place to create a target database using a delta instructions record generated based on columns comparison between the source database and the target database, comprising:
using at least one processor of a device storing a source database, the at least one processor is used for:
receiving a delta instructions record comprising instructions for applying changes detected between a source database comprising a plurality of data items contained in a plurality of tables organized in a plurality of tuples and a plurality of columns and a target database comprising at least one data item changed compared to a respective data item in the source database, the delta instructions record is created by comparing between a serialized source stream and a serialized target stream created for the source database and for the target database respectively by concatenating a data item of each cell of each of the plurality of columns to a preceding data item of a cell preceding the respective cell in the respective column; and
updating the source database in a plurality of iteration by performing the following in each of the plurality of iterations:
read a respective one of a plurality of segments of the source database from a storage medium,
update the respective segment by applying at least some of a plurality of instructions included in the delta instructions record which relate to the respective segment, and
write the respective updated segment to the storage medium.

13. The method of claim 12, wherein the source database is a navigation map database comprising at least one table in which the plurality of tuples are tiles corresponding to respective geographical regions and each of the plurality of columns is a data layer comprising data associated with the respective geographical region.

14. The method of claim 13, further comprising the at least one table is a multi-dimension table in which each tile is associated with a plurality of data layers.

15. The method of claim 12, further comprising manipulating a representation of the source database to create a representation for the source database that is compatible with a representation of the source database used to create the delta instructions record.

16. The method of claim 12, wherein a size of each of the plurality of segments is fixed and/or adjustable according to volatile memory resource available at the device.

17. The method of claim 12, wherein the at least one processor uses an abstraction layer for accessing the source database as a virtual file system in which each of the plurality of tables is accessed as a folder and each of the plurality of tuples is accessed as a file.

18. The method of claim 17, wherein the file abstraction of each of the plurality of tuples support random read access.

19. The method of claim 17, wherein the file abstraction of each of the plurality of tuples support sequential write access.

20. A device for updating a source database in-place to create a target database using a delta instructions record generated based on columns comparison between the source database and the target database, comprising:
using at least one processor of a device storing a source database, the at least one processor is executing a code, the code comprising:
code instructions to receive a delta instructions record comprising instructions for applying changes detected between a source database comprising a plurality of data items contained in a plurality of tables organized in a plurality of tuples and a plurality of columns and a target database comprising at least one data item changed compared to a respective data item in the source database, the delta instructions record is created by comparing between a serialized source stream and a serialized target stream created for the source database and for the target database respectively by concatenating a data item of each cell of each of the plurality of columns to a preceding data item of a cell preceding the respective cell in the respective column; and
code instructions to update the source database in a plurality of iteration by performing the following in each of the plurality of iterations:
read a respective one of a plurality of segments of the source database from a storage medium,
update the respective segment by applying at least some of a plurality of instructions included in the delta instructions record which relate to the respective segment, and
write the respective updated segment to the storage medium.

* * * * *